US012093139B2

United States Patent
Fleckenstein et al.

(10) Patent No.: US 12,093,139 B2
(45) Date of Patent: Sep. 17, 2024

(54) ROLLING BACK A DATABASE TRANSACTION (71) Applicant: INTERNATIONAL BUSINESS MACHINES CORPORATION, Armonk, NY (US)

(72) Inventors: Karl Fleckenstein, Malsch (DE); Jens Peter Seifert, Gaertringen (DE); Hans-Jürgen Zeltwanger, Weinsberg (DE); Thomas Rech, Rittersheim (DE); Dirk Nakott, Stuttgart (DE); Holger Hellmuth, Bensheim (DE); Alexander Zietlow, Sandhausen (DE); Martin Jungfer, Ostelsheim (DE)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 17/644,569

(22) Filed: Dec. 16, 2021

(65) Prior Publication Data
US 2023/0195582 A1    Jun. 22, 2023

(51) Int. Cl.
*G06F 16/00* (2019.01)
*G06F 11/14* (2006.01)
*G06F 16/23* (2019.01)

(52) U.S. Cl.
CPC ...... *G06F 11/1469* (2013.01); *G06F 16/2379* (2019.01); *G06F 2201/84* (2013.01)

(58) Field of Classification Search
CPC ............ G06F 11/1469; G06F 16/2379; G06F 2201/84
See application file for complete search history.

(56) References Cited

U.S. PATENT DOCUMENTS

| | | | | |
|---|---|---|---|---|
| 6,651,073 | B1 | 11/2003 | Lyle | |
| 8,296,271 | B1 * | 10/2012 | Richardson | G06F 11/1469 707/674 |
| 8,495,009 | B2 * | 7/2013 | Khanna | G06F 16/24565 707/609 |
| 8,856,083 | B2 * | 10/2014 | Ganesh | G06F 16/2453 707/682 |
| 9,460,008 | B1 * | 10/2016 | Leshinsky | G06F 12/0253 |
| 9,626,394 | B2 | 4/2017 | Schmidt | |
| 9,804,935 | B1 * | 10/2017 | Holenstein | G06F 11/1469 |

(Continued)

FOREIGN PATENT DOCUMENTS

| | | | |
|---|---|---|---|
| CN | 101089857 A | 12/2007 | |
| CN | 102402623 A | 4/2012 | |

(Continued)

OTHER PUBLICATIONS

International Application No. PCT/IB2022/062240, Notification of Transmittal of the International Search Report and Written Opinon, mailed Mar. 2, 2023, 11 pgs.

*Primary Examiner* — Noosha Arjomandi
(74) *Attorney, Agent, or Firm* — Stosch Sabo (57) ABSTRACT

A system and method for a database management system. The method comprises: receiving a database transaction for inserting a set of records in a database table of the database management system or for creating indexes. The database transaction may be executed using the database management system. The database management system may rollback the database transaction by truncating the database table or the created indexes.

20 Claims, 6 Drawing Sheets

(56) References Cited

U.S. PATENT DOCUMENTS

| | | | |
|---|---|---|---|
| 10,489,356 B1* | 11/2019 | Shah | G06F 16/211 |
| 10,803,012 B1* | 10/2020 | Madhavarapu | G06F 16/113 |
| 10,872,073 B1* | 12/2020 | Gupta | G06F 16/2336 |
| 2004/0267835 A1* | 12/2004 | Zwilling | G06F 11/1451 |
| 2013/0151480 A1* | 6/2013 | Dhamankar | G06F 16/215 |
| | | | 707/690 |
| 2014/0379674 A1* | 12/2014 | Bar | G06F 16/284 |
| | | | 707/703 |
| 2015/0019792 A1* | 1/2015 | Swanson | G06F 9/54 |
| | | | 711/102 |
| 2015/0172390 A1* | 6/2015 | Colrain | H04L 67/142 |
| | | | 709/203 |
| 2015/0254286 A1* | 9/2015 | Dutta | G06F 16/215 |
| | | | 707/609 |
| 2016/0042016 A1 | 2/2016 | Faerber | |
| 2017/0277744 A1* | 9/2017 | Mohandas | G06F 16/2365 |
| 2019/0236179 A1* | 8/2019 | Priebe | G06F 16/2358 |
| 2020/0034251 A1 | 1/2020 | Antonopoulos | |
| 2020/0125457 A1* | 4/2020 | Lahiri | G06F 11/1469 |
| 2021/0124647 A1* | 4/2021 | Kasani | G06F 16/2219 |
| 2021/0157682 A1* | 5/2021 | Antonopoulos | G06F 16/2379 |
| 2021/0382876 A1* | 12/2021 | Priebe | G06F 11/1469 |
| 2022/0150204 A1* | 5/2022 | Madhavan | H04L 47/622 |

FOREIGN PATENT DOCUMENTS

| | | |
|---|---|---|
| CN | 109101368 A | 12/2018 |
| CN | 113254425 A | 8/2021 |

* cited by examiner

ROLLING BACK A DATABASE TRANSACTION

BACKGROUND

The present disclosure relates to the field of digital computer systems, and more specifically, to a method for rolling back a database transaction.

In database technologies, a rollback may be an operation which returns the database to some previous state. Rollbacks may be important for recovering, for example, from database server crashes, by rolling back any transaction which was active at the time of the crash, the database is restored to a consistent state. The rollback may be performed based on log records. The log records may enable to perform database recovery to a point in time and also feed standby systems with log records from source systems to keep standby systems in sync with source systems. However, the rollback commands may be very resource consuming.

SUMMARY

Various embodiments provide a method, computer system and computer program product as described by the subject matter of the independent claims. Advantageous embodiments are described in the dependent claims. Embodiments of the present disclosure can be freely combined with each other if they are not mutually exclusive.

In one aspect, the disclosure relates to a method for a database management system. The method comprises receiving a database transaction for inserting a set of records in a database table of the database management system or for creating indexes (the database transaction is for inserting the set of records or is for creating the indexes) and executing the database transaction using the database management system. In response to determining that a rollback of the database transaction is to be performed, rolling back by the database management system the database transaction. The rollback comprising truncating the table or the created indexes. The expression "truncate a database table" means delete all records of the database table without using logged changes of the database management system. The expression "truncate an index" means delete or drop the index without using logged changes of the database management system.

In another aspect, the disclosure relates to a computer program product comprising a computer-readable storage medium having computer-readable program code embodied therewith, the computer-readable program code being configured to implement all of the steps of the method according to preceding embodiments.

In another aspect, the disclosure relates to a computer system comprising a database management system. The computer system is configured to receive a database transaction for inserting a set of records in a database table of the database management system or for creating an index, and execute the database transaction using the database management system. The computer system is configured to in response to determining that a rollback of the database transaction is to be performed, roll back by the database management system the database transaction, the rollback comprising truncating the database table or the created index.

BRIEF DESCRIPTION OF THE DRAWINGS

In the following embodiments of the disclosure are explained in greater detail, by way of example only, making reference to the drawings in which.

DETAILED DESCRIPTION

The descriptions of the various embodiments of the present disclosure will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Database transactions (also referred to as transactions) may generally represent any change in a database. The database transaction may be a unit of work performed by a database management system (or similar system) against a database. The database transaction may be treated in a coherent way independent of other transactions. The database transaction may comprise one or more instructions or statements such as merge, delete, insert, update or create statements. During execution of the database transaction, the database may be inconsistent. Once the database transaction is committed, the state of the database may be changed from one consistent state to another. A database transaction may have various states. The transaction may be in an active state from the time the execution process of the transaction begins until the transaction completes. For example, the transaction may be in the active state between the time the execution process of the transaction begins and the commit point of the transaction. The commit point may be a point in time at which changes of the transaction are guaranteed to have been written to disk. During this state, read or write operations can be performed. The transaction is said to be active if the transaction is in the active state. When the transaction is in a committed state, it has already completed its execution successfully and all of its changes are recorded to the database permanently. Thus, the database transaction can either be committed, which may mean the statements of the transaction are applied to the database, or rolled back, which may mean that the statements are undone from the database. The rollback may be an operation which returns the database to some previous state. The database management system may be configured to determine that the rollback of the database transaction is to be performed in response to: receiving a request of the rollback e.g., a user initiates the rollback, determining that the database is restarted or crashed before a commit point of the database transaction is reached, or receiving a rollforward to a point in time recovery before the commit point of the database transaction is not reached.

The rolling back may make use of database logging. Database logging may be an important aspect for providing a highly available databases because database logs make it possible to recover from a failure. Two types of database logging may be supported, active logging and archive logging. Active logging enables to log changes to a database in an active log for active transactions, wherein the archive logging logs changes in an archive log for committed transactions. Logging changes may comprise creating log records, wherein the log records describe the changes so as to enable to undo the changes. The active log may record changes caused by database transactions that are in progress e.g., the active log stores log records of changes caused by the transactions that have not yet been committed. When a transaction that is part of the active log completes, its log records may be copied from the active log to the archive log. Each of the two logging types provides a different level of recovery capability. The advantage of the archive logging may be that rollforward recovery can use both archive log and active log to restore a database either to the end of the logs, or to a specific point in time. The archive log may, for example, be used to recover changes made after the backup was taken. This is different from active logging where an active log is used to rollback active transactions.

The active logging may use an active log space, e.g., which is a space of a disk, to store log records of the active log representing the changes. The active log space may enable a fast execution of rollbacks because the active log space may be a space of a local disk of the database management system. For each database transaction, the active log space may comprise a first space for storing log records, named update log records, which represent changes to the database. In addition, the active log space may reserve a second space for the compensation log records which note the rollback of particular changes to the database, wherein each compensation log record corresponds with exactly one other update log record of the first space. However, the log disk may be limited in space and if the number of active transactions increases, the active log space may run full.

The present subject matter may solve this issue for insert transactions that insert records in a database table, wherein the database table is an empty database table or is a non-empty table (named NE table) whose content is provided by transactions that are all completed (e.g., committed). The database transaction that inserts records in an empty database table or in said NE table may be referred to as first type database transaction. The NE table is a non-empty table comprising data provided by one or more transactions that are all completed. The database management system according to the present subject matter may be configured to rollback the first type database transactions when they are active without using or reading update log records of said transactions. The database management system may be configured to rollback the first type database transaction by truncating the database table of said first type database transaction. Truncating the database table comprises deleting all records of the database table. The deletion of the all records of the database table may, for example, be performed at a time e.g., using a single command such as TRUNCATE SQL statement. By contrast to log based individual deletions of the records, the truncation of the database table may be performed without reading logged changes of the database management system. The database management system may, for example, be configured to truncate the database table without reading the active log. This may save processing resources, in particular for mass inserts because the rollback based on update log records may take very long time after mass inserts.

The present subject matter may prevent Transaction Log Full situations, in particular if many rows are inserted into tables within one database transaction. Thus, an ad-hoc solution such as splitting a transaction with mass insert operations into several transactions in order to avoid Transaction Log Full situations may not be needed. The present subject matter may further be advantageous because only minor changes in the existing database engines may be required to implement the present subject matter and it may enable a wide range of frequent use cases. In case no rollback is required for the first type database transaction, the first type database transaction is committed, and the database management system may process the first type database transaction as usually the case like any other database transaction of the database management system.

The present subject matter may further be advantageous as it may further save processing resources by modifying the active logging for the first type transactions so that the rollback may be performed without using update log records. The present subject matter may adapt the way spaces of the active log space are allocated for the first type database transactions. For example, the database management system may store update log records of the changes caused by the first type database transaction in the active log space but without reserving the second space (e.g., for compensation log records) in order to enable rollbacks. This may be advantageous because in case of a high number of active transactions, the active log space may become quickly full if the second spaces are systematically reserved. This may save these extra log spaces for the first type transactions and thus increase the number of transactions to be processed concurrently. This may particularly be advantageous as the amount of the first type of transactions may be high. This is because the first type database transactions may be used in different fields such as data refreshing in a database system, data exports from an existing system to a target system, and online tools e.g., using Db2 ADMIN_MOVE_TABLE procedures. Thus, according to one embodiment, the method further comprises: configuring the database management system to log actions of the active first type database transaction without reserving the log space for compensation log records of the active first database transaction.

To be able to do a crash recovery from disk, databases such as Db2 may use the active log space. The active log space may contain all log records since the current first active transaction in the system, so that in case a rollback is required, all log records for performing an undo operation can be read from a local disk. With this embodiment, while after the first type transaction may be defined as follows ALTER TABLE TRUNCATE ON ROLLBACK, is still an open transaction, no access to log records on the local disk may be required to do the rollback of the table in this "TRUNCATE ON ROLLBACK" mode. This kind of transactions can be handled differently. For example, the database management system may not require one or more first log records of the first type database transaction that indicate the start point of the first type database transaction as the log records of the first type transaction, and the start point, are not required for crash recovery of the first type database transactions. In addition, the so-called compensation log records may be prevented with this embodiment. The compensation log records may enable to do undo by just reading the next log record. For example, Db2 systems may create compensation log records in an extra log space for each log record that gets rolled back. This potentially used extra log space gets reserved so that rollback is able to complete. However, this reservation further reduces the available active log space. With the present subject matter, the extra log spaces may be saved and only the TRUNCATE of table log record may need to be written as a compensation log record.

For example, the database management system may be configured to check the type of the received database transaction to determine whether the database transaction is of the first type or not. That is, it may determine whether the received database transaction insert records in an empty database table or in an NE table. If the database management system determines that the received database transaction is of the first type, the rollback may be performed without using the update log records and the second space may not be reserved for the received database transaction. This check may, for example, be implemented as follows. According to one embodiment, the method further comprises: assigning a flag to the database table, setting the flag to a first value at the beginning of the received database transaction. The first value of the flag indicates that the active log is not to be used for transaction rollbacks, wherein the database management system is configured to perform the rollback of the received database transaction based on the flag. For example, in response to determining that the database transaction is to be rolled back, the database management system may check whether the database table is assigned a flag and whether the flag has the first value and may perform the rollback without using the active log if the flag is set to the first value. The flag may be deleted or disabled, e.g., by setting it to a second value, upon committing changes caused by the received database transaction or upon finishing the rollback. For example, after rollback is complete the flag gets deleted and an empty table remains. In one example, the flag may be set automatically upon the first insert (by the received first type transaction) of a record in the table e.g., the first INSERT statement of the received first type database transaction triggers the setting of the flag. In one example, the flag may be set upon receiving the first type database transaction. In one example, the flag may be set for a given table upon creating the given table (i.e., it is empty) or upon determining that the given table is an NE table a defined herein.

The present subject matter may prevent the following disadvantages of other tables (such as NOT LOGGED INITIALLY tables) which are not assigned the flag. All changes to this other table will be flushed out to disk at commit time. This means that the commit might take very long for inserting large amount of data into this other table. Table recovery may not be possible for this other table. If the rollforward operation encounters the other table, then this other table is marked as unavailable.

In case of index creation, indexes may be flagged or marked as follows. According to one embodiment, the method further comprises: assigning a flag to each index of the database transaction to be created, the flag indicating that the active log is not to be used for transaction rollback, wherein the database management system is configured to perform the rollback of database transactions based on the flags, and disabling the flags upon finishing the rollback. In another example, if the rollback is not performed, the flags may be disabled upon committing changes caused by the database transaction. The assigning of the flag may further comprise setting the flag to the first value. For example, assigning the flag to each index (of the received database transaction) to be created may comprise marking the index with a marker. For example, the creation of the index may trigger the assignment of the flag. For example, the execution of the CREATE INDEX statement (of the received database transaction) may assign and set automatically the flag e.g., the flag may be set as part of the statement CREATE INDEX. The flag may be disabled by deleting the flag. For example, the flag may automatically be deleted upon deleting the index, e.g., the flag may be deleted if the DROP INDEX statement is executed.

Database tables with the new flag and indexes created within flagged transactions can be used like regular, permanent database tables and database indexes. They may be fully recoverable. Point in time recovery may also be supported. In addition, these tables and indexes can be used in the widely used high availability scenarios that are based on the log shipping method from primary to standby databases.

According to one embodiment, the method further comprises receiving a rollforward request, and using the archive log to perform the rollforward of the first database transaction. The archive log may be used to guarantee atomicity, consistency, isolation and durability (ACID) properties over crashes or hardware failures. The archive log may be one or more files listing changes to a database, stored in a stable storage format.

According to one embodiment, the database table that is referenced by the received first type database transaction is a permanent table. This may be advantageous because the temporal tables may have the following restrictions. They are not permanently available and may not be shared across database connections.

For example, the truncating of the database table comprises executing a TRUNCATE SQL statement. The truncating of the indexes comprises executing a DROP INDEX SQL statement. These examples may enable a seamless integration of the present method with existing databases such as Db2. For example, the flag of the created indexes may get reverted/disabled upon executing the drop index in case of rollback.

According to one embodiment, the database transaction is received from an application, wherein the application is configured to perform any one of: data refreshing in a database system, exporting data from an existing system to a target system, executing an online data movement procedure such as a Db2 ADMIN_MOVE_TABLE procedure. The online data movement procedure may move the data in an active table into a new table object (e.g., with the same name), while the data may remain online and available for access. This may indicate that the first type database transactions come from different sources and may thus be significantly high in number.

According to one embodiment, the method is performed when the set of records comprises a number of records higher than a threshold. The threshold may, for example, be an integer number higher than or equal to one. This may provide simplified mass INSERT processing into permanent database tables which are empty at the beginning of the INSERT processing.

Figure 1:
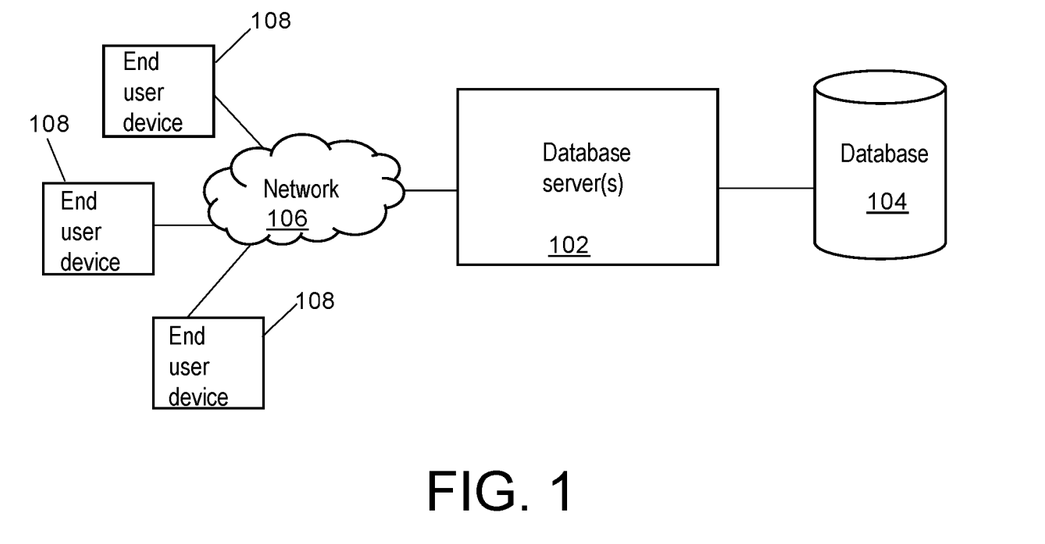
FIG. 1 illustrates an example environment for implementing the present subject matter.

FIG. 1 shows an example environment for implementation of the present subject matter. One or more database servers 102 may have access to relational database 104. Multiple database servers 102 may be configured, in some examples, to act as a server farm. One or more database servers 102 may be connected to network 106. One or more client or end user devices 108 may access database 104 via network 106 and one or more database servers 102.

Network 106 may be implemented by any number of any suitable communications media (e.g., wide area network (WAN), local area network (LAN), Internet, Intranet, etc.). Alternatively, one or more database servers 102 and end user devices 108 may be local to each other, and may communicate via any appropriate local communication medium (e.g., local area network (LAN), hardwire, wireless link, Intranet, etc.).

End user devices 108 enable users to submit queries to one or more database servers 102 to query database 104 and receive query results. Database 104 may store various information for queries and other database system operations. Database 104 may be implemented by any conventional or other database or storage unit, may be local to or remote from one or more servers 102 and end user devices 108, and may communicate via any appropriate communication medium (e.g., local area network (LAN), wide area network (WAN), Internet, hardwired, wireless link, Intranet, etc.). End user devices 108 may present a graphical user interface (e.g., GUI, etc.) or other interfaces (e.g., command line prompts, menu screens, etc.) to solicit information from users pertaining to desired data and reports, and may provide the data and the reports.

Figure 2:
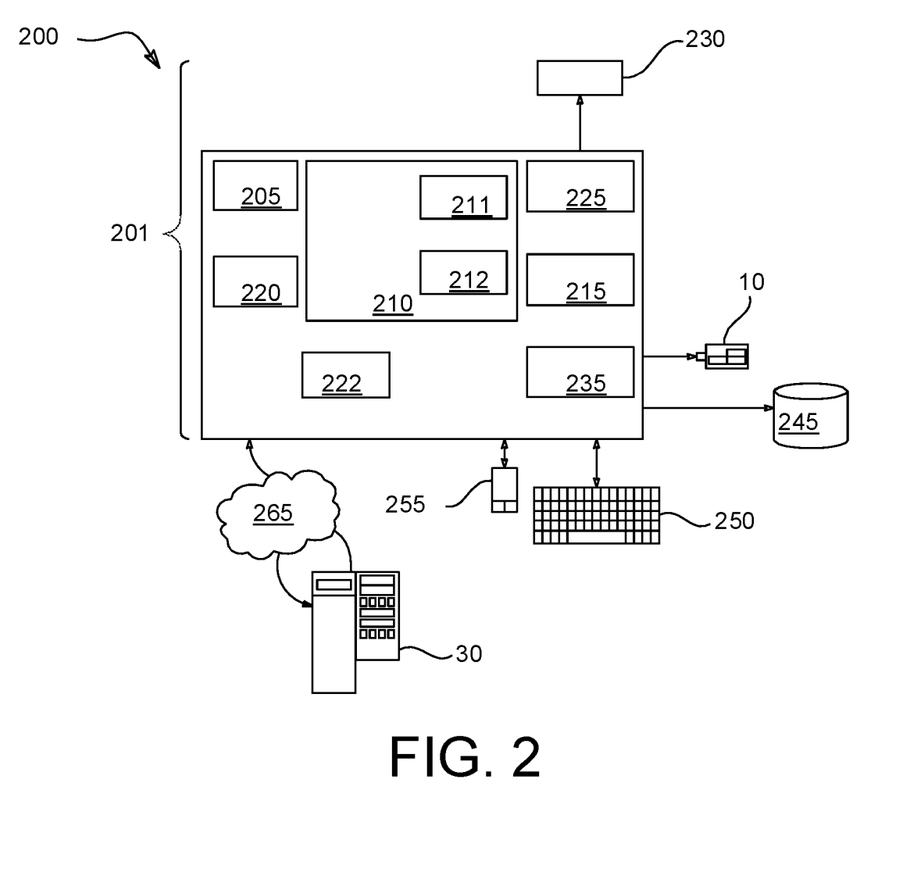
FIG. 2. represents a general computerized system suited for implementing at least part of method steps as involved in the disclosure.

FIG. 2 represents a general computerized system 200 suited for implementing at least part of method steps as involved in the disclosure. For example, the database server 102 may comprise the system 200.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 212, 222 (including firmware 222), hardware (processor) 205, or a combination thereof. In exemplary embodiments, the methods described herein are implemented in software, as an executable program, and is executed by a special or general-purpose digital computer, such as a personal computer, workstation, minicomputer, or mainframe computer. The most general system 200 therefore includes a general-purpose computer 201.

In exemplary embodiments, in terms of hardware architecture, as shown in FIG. 2, the computer 201 includes a processor 205, memory (main memory) 210 coupled to a memory controller 215, and one or more input and/or output (I/O) devices (or peripherals) 10, 245 that are communicatively coupled via a local input/output controller 235. The input/output controller 235 can be, but is not limited to, one or more buses or other wired or wireless connections, as is known in the art. The input/output controller 235 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 245 may generally include any generalized cryptographic card or smart card known in the art.

The processor 205 is a hardware device for executing software, particularly that stored in memory 210. The processor 205 can be any custom made or commercially available processor, a central processing unit (CPU), an auxiliary processor among several processors associated with the computer 201, a semiconductor-based microprocessor (in the form of a microchip or chip set), or generally any device for executing software instructions.

The memory 210 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 210 can have a distributed architecture, where various components are situated remote from one another, but can be accessed by the processor 205.

The software in memory 210 may include one or more separate programs, each of which comprises an ordered listing of executable instructions for implementing logical functions, notably functions involved in embodiments of this disclosure. In the example of FIG. 2, software in the memory 210 includes instructions 212 e.g. instructions to manage databases such as a database management system.

The software in memory 210 shall also typically include a suitable operating system (OS) 211. The OS 211 essentially controls the execution of other computer programs, such as possibly software 212 for implementing methods as described herein.

The methods described herein may be in the form of a source program 212, executable program 212 (object code), script, or any other entity comprising a set of instructions 212 to be performed. When a source program, then the program needs to be translated via a compiler, assembler, interpreter, or the like, which may or may not be included within the memory 210, so as to operate properly in connection with the OS 211. Furthermore, the methods can be written as an object-oriented programming language, which has classes of data and methods, or a procedure programming language, which has routines, subroutines, and/or functions.

In exemplary embodiments, a conventional keyboard 250 and mouse 255 can be coupled to the input/output controller 235. Other output devices such as the I/O devices 245 may include input devices, for example but not limited to a printer, a scanner, microphone, and the like. Finally, the I/O devices 10, 245 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 245 can be any generalized cryptographic card or smart card known in the art. The system 200 can further include a display controller 225 coupled to a display 230. In exemplary embodiments, the system 200 can further include a network interface for coupling to a network 265. The network 265 can be an IP-based network for communication between the computer 201 and any external server, client and the like via a broadband connection. The network 265 transmits and receives data between the computer 201 and external systems 30, which can be involved to perform part, or all of the steps of the methods discussed herein. In exemplary embodiments, network 265 can be a managed IP network administered by a service provider. The network 265 may be implemented in a wireless fashion, e.g., using wireless protocols and technologies, such as WiFi, WiMax, etc. The network 265 can also be a packet-switched network such as a local area network, wide area network, metropolitan area network, Internet network, or other similar type of network environment. The network 265 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 201 is a PC, workstation, intelligent device or the like, the software in the memory 210 may further include a basic input output system (BIOS) 222. The BIOS is a set of essential software routines that initialize and test hardware at startup, start the OS 211, and support the transfer of data among the hardware devices. The BIOS is stored in ROM so that the BIOS can be executed when the computer 201 is activated.

When the computer 201 is in operation, the processor 205 is configured to execute software 212 stored within the memory 210, to communicate data to and from the memory 210, and to generally control operations of the computer 201 pursuant to the software. The methods described herein and the OS 211, in whole or in part, but typically the latter, are read by the processor 205, possibly buffered within the processor 205, and then executed.

When the systems and methods described herein are implemented in software 212, as is shown in FIG. 2, the methods can be stored on any computer readable medium, such as storage 220, for use by or in connection with any computer related system or method. The storage 220 may comprise a disk storage such as HDD storage.

Figure 3:
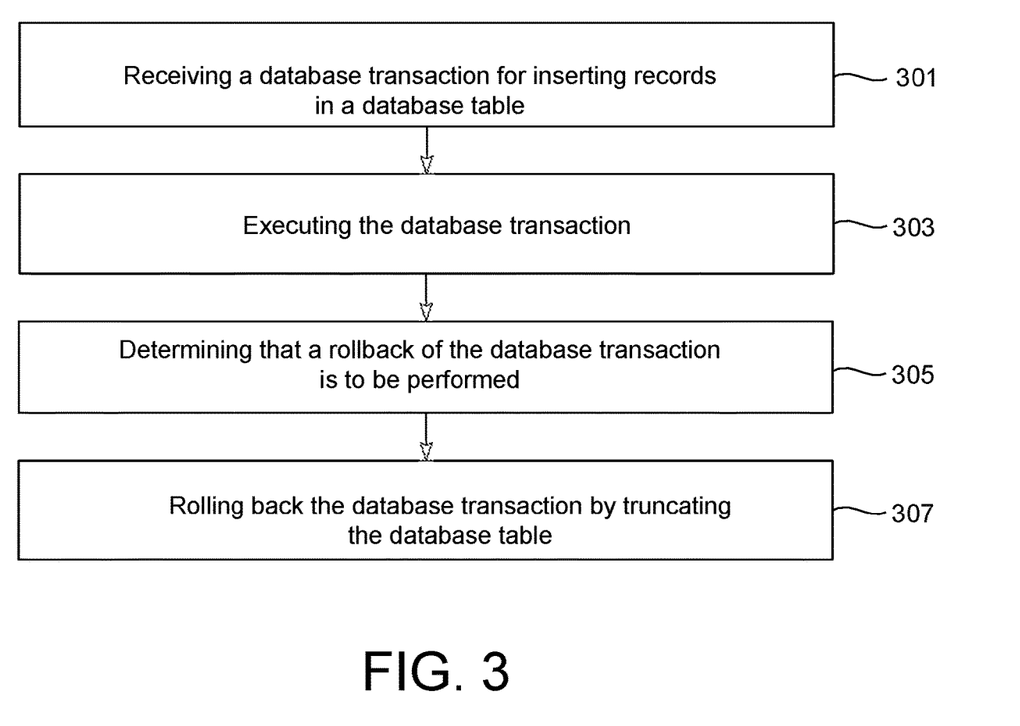
FIG. 3 is a flowchart of a method for rolling back a database transaction in accordance with an example of the present subject matter.

FIG. 3 is a flowchart of a method for rolling back a database transaction in accordance with an example of the present subject matter. For the purpose of explanation, the method described in FIG. 3 may be implemented in the system illustrated in FIG. 1 or 2, but is not limited to this implementation. The method may, for example, be performed by the system 200.

A database transaction may be received in step 301. The database transaction may reference a target table. The target table may be an empty table or a NE table. As described before, the NE table is a table comprising records caused by transactions that are all completed (e.g., committed). The target table may, for example, be part of a database. The database transaction may, for example, be received from the end user device 108. The database transaction may comprise insert statements for inserting a set of records in the target table. The database transaction may be executed in step 303. The database management system may determine in step 305 that a rollback of the database transaction is required. For example, the database management system may determine that the rollback of the database transaction is required in response to receiving a rollback request for the database transaction. The rollback request may be received while the database transaction is still active. The rollback request may, for example, be caused by an erroneous execution of the database transaction. In another example, the database management system may determine that the rollback of the database transaction is required in response to determining that the database is restarted or crashed before the commit point of the database transaction is reached. In this case, the rollback may be part of a crash recovery process. In another example, the database management system may determine that the rollback of the database transaction is required in response to receiving a rollforward request of the database transaction before the commit point of the database transaction is reached. Rollbacks may be important for database integrity, because they mean that the database can be restored to a clean copy even after erroneous operations are performed. They may be crucial for recovering from database server crashes, e.g., by rolling back any transaction which was active at the time of the crash, the database is restored to a consistent state.

The database management system may, for example, determine whether the database transaction is the first type database transaction and whether the database transaction was active up to the time of performing step 305 in order to perform the rollback in step 307. A rolling back of the database transaction may be performed in step 307. For example, if the database transaction is of the first type and it is active, the rolling back may be performed by truncating the target table. The target table may be truncated without using logged changes of the database management system. Truncating the target table may, for example, comprise deleting all the records in the target table, wherein the deletion may be performed without reading any update log record. If the target table was an NE table before the database transaction is received, the target table may comprise records inserted by the received database transaction but also records caused by all committed transactions of the NE table. Indeed, since the database table was empty table or NE table before the database transaction is executed, truncating the database table may be performed without relying on a history of logged changes. This may save processing resources. The truncation of the database table may, for example, be performed by executing the TRUNCATE SQL statement.

Figure 4A:
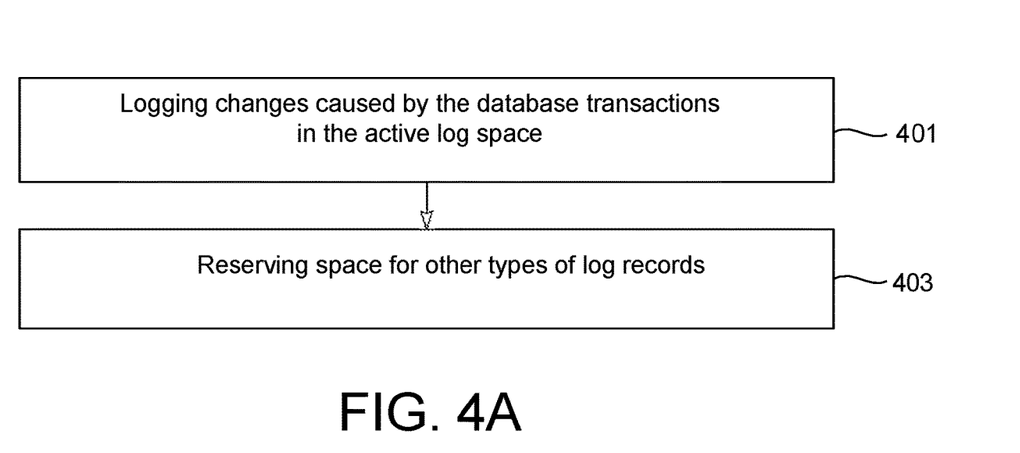
FIG. 4A is a flowchart of a method for logging changes in accordance with an example of the present subject matter.

FIG. 4A is a flowchart of a method for logging actions of database transactions in accordance with an example of the present subject matter. For the purpose of explanation, the method described in FIG. 4A may be implemented in the system illustrated in FIG. 1 or 2, but is not limited to this implementation. The method may, for example, be performed by the system 200.

Figure 4B:
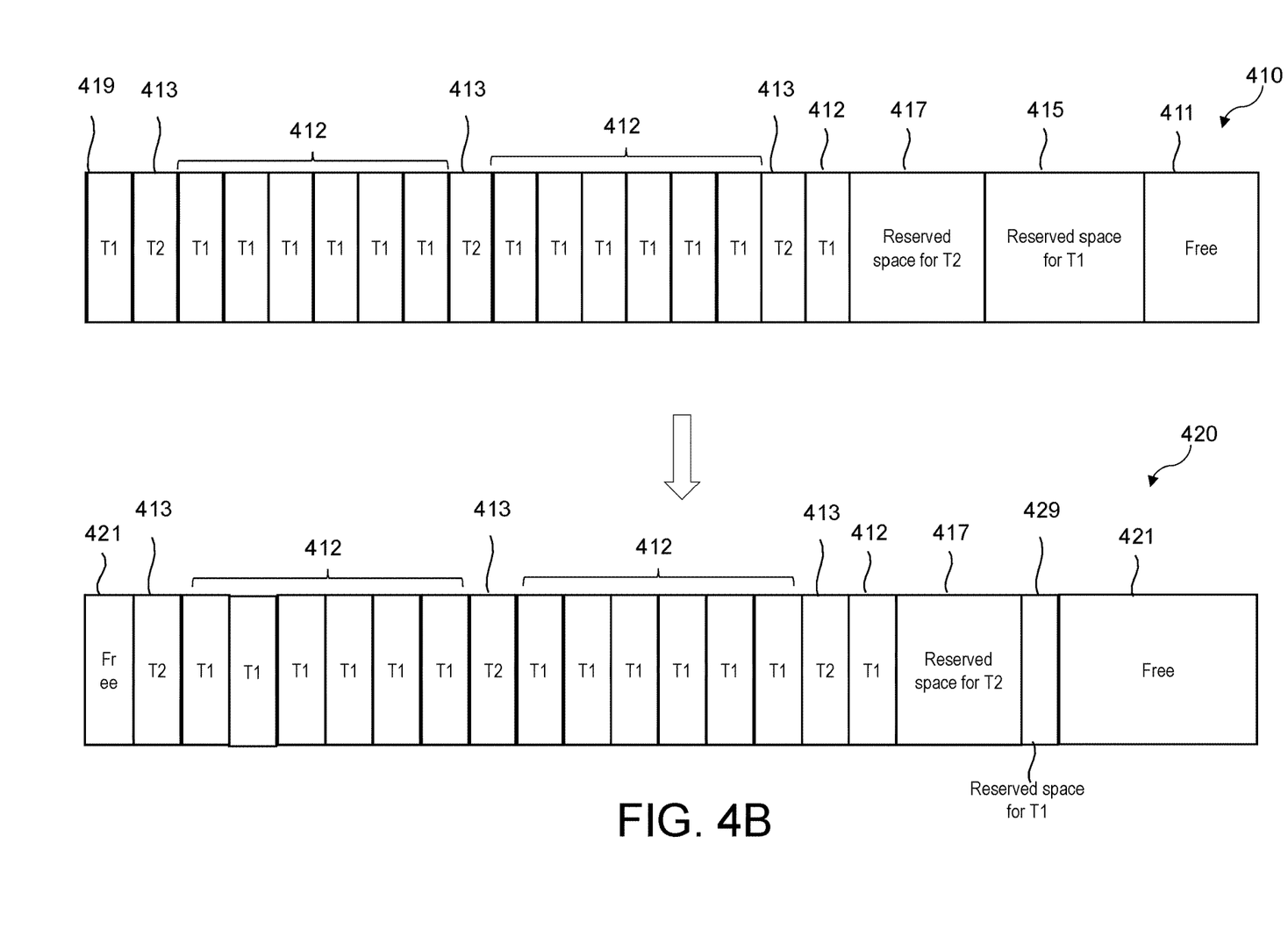
FIG. 4B illustrates an example content of the active log space.

Assuming for simplification of the description that the active database transactions being processed by the database management system are transactions T1 and T2 as indicated in FIG. 4B. The transaction T1 may comprise statements for inserting records in an empty database table, while the transaction T2 may be another type of transactions. FIG. 4B shows the active log space assigned to the active log with 410 and without 420 applying the present subject matter.

The active log space 410, without applying the present subject matter, may comprise update log records 412 of the transaction T1 and the update log records 413 (e.g., the update log record may be the so-called REDO log record) of the transaction T2. In addition, two extra spaces 415 and 417 are reserved for the two transactions T1 and T2 respectively. The reserved spaces 415 and 417 may store compensation log records associated with the update records 412 and 413 respectively. In other words, the reserved spaces 415 and 417 may enable to rollback the transaction T1 and T2 respectively. The transaction T1 is older than the transaction T2, and the active log space may comprise a log record (named initial log record) 419 of the transaction T1 that enables to perform rollback of the transactions T1 and T2. The initial log record 419 may indicate the start or beginning of the changes caused by the database transaction T1.

With the present method, the active log space 420 may be filled as follows. The update log records of changes 412 and 413 caused by the execution of the database transaction T1 and T2 respectively may be saved in step 401 in the active log space. In addition, since the transaction T2 is not of the first type, the space 417 may be reserved in step 403 for the transaction T2 which may be used as described above for compensation log records. As to the first type transaction T1, there is no space reserved for the compensation log records and the initial log record 419 is also not added to the active log space 420. The initial log record 419 may (directly) be written into the archive log. FIG. 4B shows the status of the active log space before the rollback is executed. For example, upon determining that the rollback is required and before the rollback is executed, the database management system may reserve space 429 for the rollback of the transaction of T1. The reservation for the transaction T1 rollback may only require a small reserved space 429 for rolling back the TRUNCATE operation. That is, with the present subject matter only the TRUNCATE of table log record 429 may be written as a compensation log record. Thus, less active log space is required for the transaction and the free space 421 in the active log space 420 is larger than the free space 411 in the active log space 410.

Figure 5:
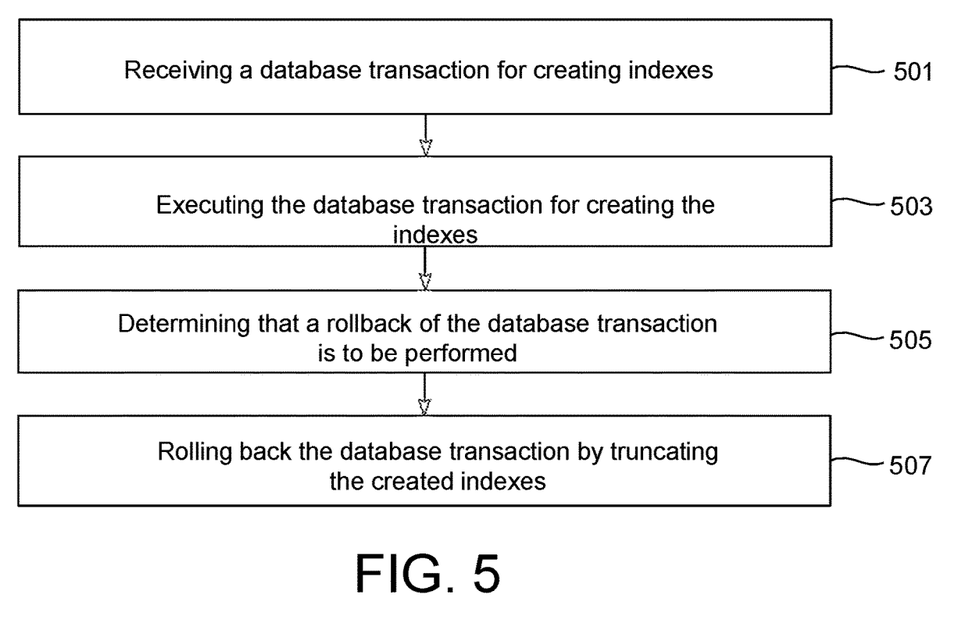
FIG. 5 is a flowchart of a method for rolling back a database transaction in accordance with an example of the present subject matter.

FIG. 5 is a flowchart of a method for rolling back a database transaction in accordance with an example of the present subject matter. For the purpose of explanation, the method described in FIG. 5 may be implemented in the system illustrated in FIG. 1 or 2, but is not limited to this implementation. The method may, for example, be performed by the system 200.

A database transaction may be received in step 501. The database transaction may comprise statements for creating indexes. The database transaction may be executed in step 503. The execution of the database transaction may, for example, comprise the execution of the statements CREATE INDEX to create the indexes. The database management system may determine in step 505 that a rollback of the database transaction is required. For example, the database management system may determine that the rollback of the database transaction is required in response to receiving a rollback request for the database transaction. The rollback request may, for example, be caused by an erroneous execution of the database transaction. A rolling back of the database transaction may be performed in step 507. The rolling back may be performed by truncating the created indexes. Truncating the indexes may, for example, comprise deleting the created indexes without reading update log records e.g., using a SQL DROP INDEX statement.

Figure 6:
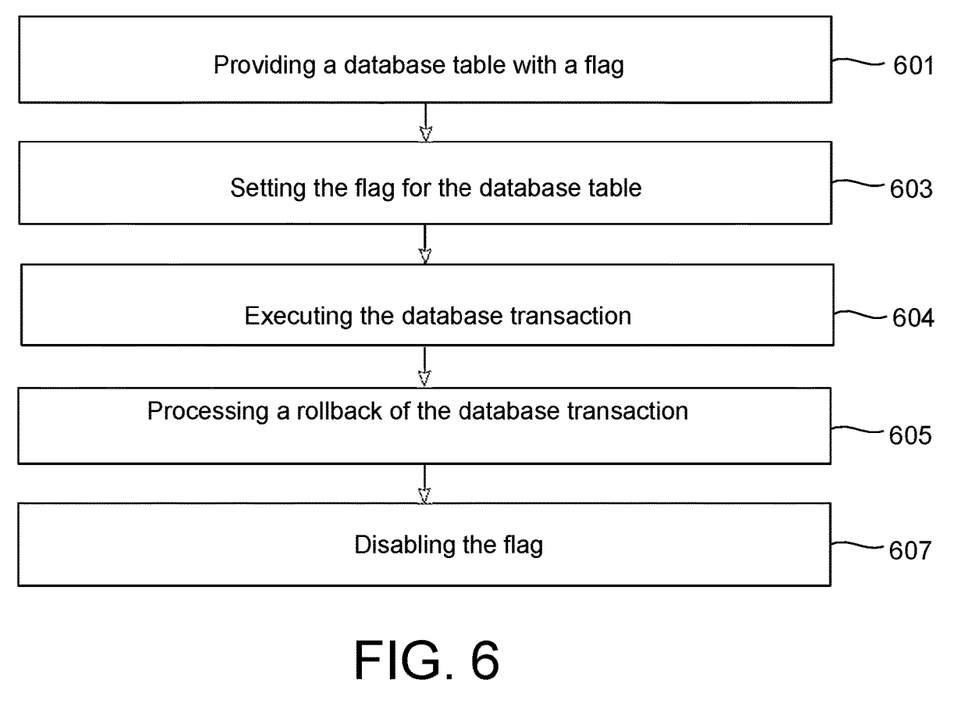
FIG. 6 is a flowchart of a method for rolling back a database transaction in accordance with an example of the present subject matter.

FIG. 6 is a flowchart of a method for rolling back a database transaction in accordance with an example of the present subject matter. For the purpose of explanation, the method described in FIG. 6 may be implemented in the system illustrated in FIG. 1 or 2, but is not limited to this implementation. The method may, for example, be performed by the system 200.

A database table may be provided in step 601. The database table may be an empty table or NE table. The database table may be named "Inflight Table". The database table may be a permanent database table which has a flag named "Rollback_Truncate" flag. This flag may be defined by extending existing SQL "ALTER TABLE" statement e.g., as follows: ALTER TABLE <xyz table> TRUNCATE ON ROLLBACK. The application that provides the database transaction may set in step 603 the "Rollback_Truncate" flag at beginning of a transaction before a first row is inserted into the database table by said transaction. The database transaction workloads may be executed and logged in step 604. A rollback processing may be performed in step 605 using an SQL Truncate statement on the database table without using logged changes instead of the traditional time-consuming row-based rollback processing. This may be advantageous, because table truncation of a large table may be a very fast SQL statement. This may significantly improve performances of the transaction Rollback processing. In addition, the "Rollback_Truncate" flag may be disabled in step 607 after rolling back the database transaction. In another example, if the transaction is not rolled back (see FIG. 8), a commit processing of the transaction may be performed and the "Rollback_Truncate" flag gets disabled. Hence, with the present method, transactions which only insert into "Inflight Tables" may not be considered for Transaction Log Full situations, because there may be no need to rollback these tables using log records. SELECT statements on other tables may be possible in these transactions.

Figure 7:
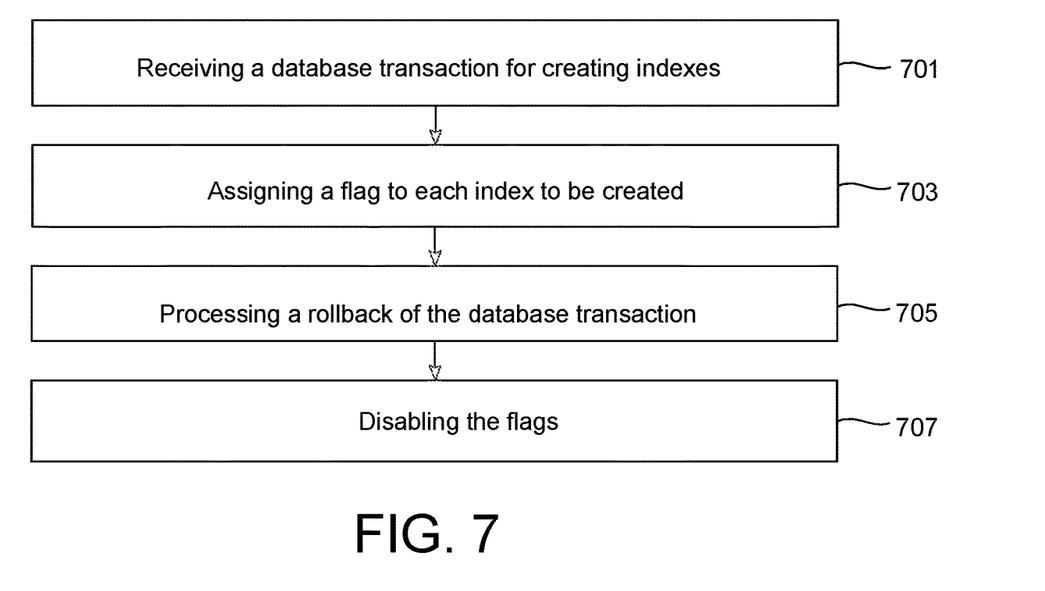
FIG. 7 is a flowchart of a method for rolling back a database transaction in accordance with an example of the present subject matter.

FIG. 7 is a flowchart of a method for rolling back a database transaction in accordance with an example of the present subject matter. For the purpose of explanation, the method described in FIG. 7 may be implemented in the system illustrated in FIG. 1 or 2, but is not limited to this implementation. The method may, for example, be performed by the system A database transaction may be received in step 701. The database transaction may comprise statements for creating indexes. The database transaction may be referred to as Inflight Index Create transaction. The database transaction is a transaction in which only indexes are created. A flag named "Rollback_Drop_Index" flag may be assigned to each index in step 703 as part of execution of the CREATE INDEX statement. Furthermore, the CREATE INDEX workloads may be logged as usually. The rollback may be performed in step 705 using a SQL DROP INDEX statement on all indexes created in this transaction instead of the traditional time-consuming row-based rollback processing. DROP INDEX statement may run very fast. This may significantly improve performances of the transaction Rollback processing. In addition, transactions with enabled "Rollback_Drop_Index" flag may not be considered for Transaction Log Full situations, because there may be no need to rollback the changes of the indexes. The flags may be disabled in step 707 e.g., the execution of the DROP INDEX statements may trigger the deletion of the flags. In another example, if the transaction is not rolled back (see FIG. 9), a commit processing of the transaction may be performed and the flags get disabled.

The methods of FIGS. 6 and 7 describe the database table type "Inflight Table" and the "Inflight Index Create" transaction. Both concepts may improve the rollback processing of permanent database tables and indexes significantly. In addition, Transaction Log Full situations can be avoided. Instead of the traditional time-consuming row based rollback processing, simple and very fast operations such as Table TRUNCATE or DROP INDEX are performed during transaction rollback.

Figure 8:
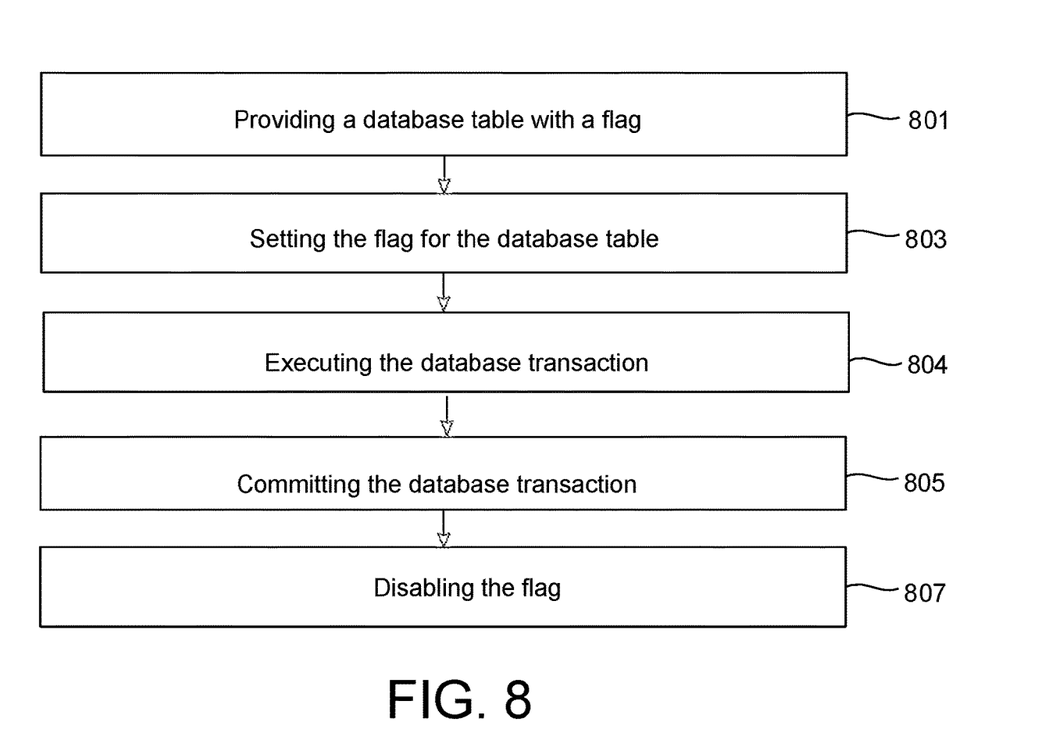
FIG. 8 is a flowchart of a method for executing a database transaction in accordance with an example of the present subject matter.

FIG. 8 is a flowchart of a method for executing a database transaction in accordance with an example of the present subject matter. For the purpose of explanation, the method described in FIG. 8 may be implemented in the system illustrated in FIG. 1 or 2, but is not limited to this implementation. The method may, for example, be performed by the system 200.

A database table may be provided in step 801. The database table may be an empty table or NE table. The database table may be named "Inflight Table". The database table may be a permanent database table which has a flag named "Rollback_Truncate" flag. This flag may be defined by extending existing SQL "ALTER TABLE" statement e.g., as follows: ALTER TABLE <xyz table> TRUNCATE ON ROLLBACK. The application that provides the database transaction may set in step 803 the "Rollback_Truncate" flag at beginning of a transaction before a first row is inserted into the database table by said transaction. The database transaction workloads may be executed and logged in step 804. The database transaction may be committed in step 805 e.g., this means that a rollback processing may not be needed. The "Rollback_Truncate" flag may be disabled in step 807 after committing the database transaction. After committing the database transaction, the database table may become a regular table and can thus be treated accordingly. For example, the REDO log records generated by the insertion of the records may be stored in a source system of a Db2 HADR system, and can further be used at the standby system of the Db2 HADR system to apply the changes at the standby system. This may enable to synchronize the two systems.

Figure 9:
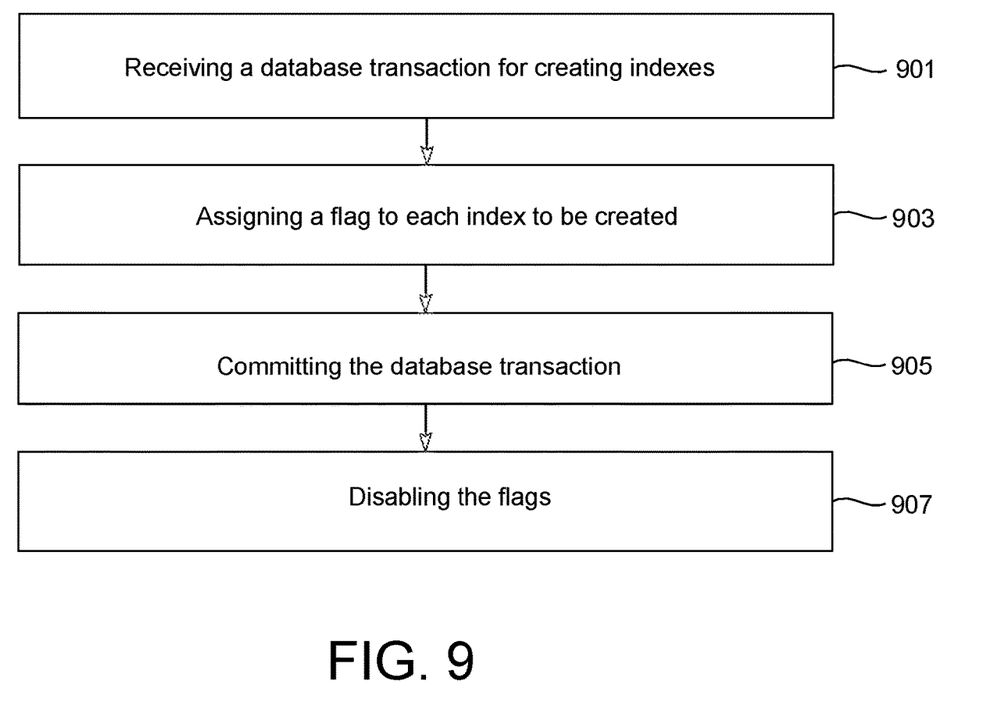
FIG. 9 is a flowchart of a method for executing a database transaction in accordance with an example of the present subject matter.

FIG. 9 is a flowchart of a method for executing a database transaction in accordance with an example of the present subject matter. For the purpose of explanation, the method described in FIG. 9 may be implemented in the system illustrated in FIG. 1 or 2, but is not limited to this implementation. The method may, for example, be performed by the system 200.

A database transaction may be received in step 901. The database transaction may comprise statements for creating indexes. The database transaction may be referred to as Inflight Index Create transaction. The database transaction is a transaction in which only indexes are created. A flag named "Rollback_Drop_Index" flag may be assigned to each index in step 903 as part of execution of the CREATE INDEX statement. The CREATE INDEX workloads may be logged as usually. The commit of the database transaction may be performed in step 905 The flags may be disabled in step 907 after the commit is executed. After the commit, the indexes may be available. For example, the REDO log records generated by the creation of the indexes may be stored in a source system of a Db2 HADR system, and can further be used at the standby system of the Db2 HADR system to apply the changes at the standby system. This may enable to synchronize the two systems.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method comprising:
   executing a database transaction using a database management system;
   configuring the database management system to store logged changes of the database management system in an active log occupying an active log space, wherein the database management system is configured to log actions of the database transaction in the active log and to reserve a log space in the active log space for enabling a rollback of the database transaction;
   receiving an indication that the rollback of the database transaction is to be performed; and
   rolling back by the database management system the database transaction, by truncating one selected from the group consisting of: a database table, and a created index.

2. The method of claim 1, the method further comprising:
   excluding the reservation of the log space for the database transaction.

3. The method of claim 2, further comprising:
   configuring the database management system to reserve a second log space for enabling a subsequent rollback of the rollback of the database transaction.

4. The method of claim 1, further comprising:
   assigning a flag to the database table;
   setting the flag at a beginning of the database transaction, the flag indicating that the logged changes are not to be used for transaction rollback, wherein the database management system is configured to perform the rollback of the database transaction of the database table based on the flag; and
   disabling the flag in response to performing the rollback.

5. The method of claim 4, further comprising:
   in response to determining that the database transaction is committed, disabling the flag.

6. The method of claim 1, further comprising:
   assigning a flag to each index of the database transaction, the flag indicating that the logged changes are not to be used for transaction rollback, wherein the database management system is configured to perform the rollback of the database transaction based on the flags; and
   disabling the flags in response to performing the rollback.

7. The method of claim 1, further comprising:
   receiving a rollforward request; and
   using the logged changes of the database management system to perform the rollforward of the database transaction.

8. The method of claim 1, wherein the database table is a permanent table.

9. The method of claim 1, wherein the database transaction is received from an application, wherein the application is configured to perform at least one selected from the group consisting of: data refreshing in a database system, exporting data from an existing system to target system, and an online data movement to the database table.

10. The method of claim 1, the method being performed in response to a set of records comprises a number of records higher than a threshold.

11. The method of claim 1, wherein the database table is selected from the group consisting of: an empty table, and a table comprising records provided by one or more previous completed transactions.

12. The method of claim 1, further comprising:
    configuring the database management system to log actions for each active database transaction of a type of the database transaction without reserving a log space for rolling back the database transaction.

13. The method of claim 1 wherein the database transaction is selected from the group consisting of: inserting a set of records in the database table, and creating the created index.

14. A computer system comprising:
    at least one memory component;
    at least one processor, the at least one processor configured to:
    execute a database transaction using a database management system;
    configure the database management system to store logged changes of the database management system in an active log occupying an active log space, wherein the database management system is configured to log actions of the database transaction in the active log and to reserve a log space in the active log space for enabling a rollback of the database transaction;
    receive an indication that the rollback of the database transaction is to be performed; and
    roll back using the database management system the database transaction, by truncating at least one selected from the group consisting of: a database table, and a created index.

15. The system of claim 14, wherein the processor is further configured to:
    assign a flag to the database table;

set the flag at a beginning of the database transaction, the flag indicating that the logged changes are not to be used for transaction rollback, wherein the database management system is configured to perform the rollback of the database transaction of the database table based on the flag; and disable the flag if the rollback is performed.

16. The system of claim 14, wherein the processor is further configured to:

assign a flag to each index of the database transaction, the flag indicating that the logged changes are not to be used for transaction rollback, wherein the database management system is configured to perform the rollback of the database transaction based on the flags; and disable the flags if the rollback is performed.

17. The system of claim 16, wherein the processor is further configured to:

in response to determining that the database transaction is committed, disable the flags.

18. The system of claim 15, wherein the logged changes comprise update log records.

19. The system of claim 15 wherein the processor is further configured to:

configure the database management system to log actions for each active database transaction of a type of the database transaction without reserving a log space for rolling back the database transaction.

20. A computer program product comprising a computer-readable storage medium having computer-readable instructions, the computer-readable instructions configured to cause at least one computer processor to:

execute a database transaction using a database management system;

configure the database management system to store logged changes of the database management system in an active log occupying an active log space, wherein the database management system is configured to log actions of the database transaction in the active log and to reserve a log space in the active log space for enabling a rollback of the database transaction;

receive an indication that the rollback of the database transaction is to be performed; and roll back by the database management system the database transaction, by truncating one selected from the group consisting of: a database table, and a created index.

* * * * *